(12) United States Patent
Garcia et al.

(10) Patent No.: US 6,264,543 B1
(45) Date of Patent: Jul. 24, 2001

(54) MEAT TENDERIZATION AND STERILIZATION USING AXIAL PLANER SHOCKWAVES

(75) Inventors: Felipe Garcia, Panama City; Robert Woodall, Lynn Haven, both of FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/609,948

(22) Filed: Jul. 3, 2000

(51) Int. Cl.[7] .................................................. A22C 9/00
(52) U.S. Cl. ........................................................ 452/141
(58) Field of Search .............................................. 452/141

(56) References Cited

U.S. PATENT DOCUMENTS

| | | | |
|---|---|---|---|
| 2,544,724 | * | 3/1951 | Rentschler ........................... 452/141 |
| 3,492,688 | * | 2/1970 | Godfrey ................................ 452/141 |
| 3,711,896 | * | 1/1973 | Guberman et al. ................... 452/141 |
| 4,821,437 | | 4/1989 | Abramson et al. . |
| 4,829,691 | | 5/1989 | Manjos et al. . |
| 5,205,777 | * | 4/1993 | Hohenester .......................... 452/141 |
| 5,408,775 | | 4/1995 | Abramson et al. . |
| 5,799,427 | | 9/1998 | Abramson et al. . |
| 5,992,665 | | 11/1999 | Deeter . |
| 6,120,818 | * | 9/2000 | Long ..................................... 452/141 |
| 6,168,814 | * | 1/2001 | Long ..................................... 452/141 |

* cited by examiner

*Primary Examiner*—Willis Little
(74) *Attorney, Agent, or Firm*—Harvey A. Gilbert; Donald G. Peck

(57) ABSTRACT

A system and method to tenderize and sterilize meat provides for uninterrupted processing of batches of meat and avoids delays and possibility of contamination of the meat. A conveyer belt carries batches of meat through liquid in a container. First and second arrays of electro-mechanical transducers are disposed in the liquid. The first array of electro-mechanical transducers is arranged facing one side of the conveyer belt and batch of meat, and the second array of electromechanical transducers is arranged facing the other side of the conveyer belt and meat. The first and second arrays of electro-mechanical transducers are oriented and controlled to simultaneously project converging shock waves of energy to and into the batch of meat. Other batches of meat are placed on and picked up from the conveyer belt by feeder and pick-up conveyers to provide for continuous tenderizing and/or sterilizing without introducing contaminations.

35 Claims, 2 Drawing Sheets

MEAT TENDERIZATION AND STERILIZATION USING AXIAL PLANER SHOCKWAVES

STATEMENTS OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to meat processing. In particular, this invention relates to a method and system for tenderizing and sterilizing meat using electro-mechanical transducers to project opposing planar shock waves in meat.

Meat is an important source of nutrition in most balanced diets. Generally speaking, more desirable cuts of meat are in greater demand since they typically have higher fat content and are more tender than tougher cuts. However, consumers are becoming increasingly aware that excessive fat consumption is unhealthy, and they are looking for alternatives. Less-desirable cuts that are leaner and lower in fat content may be beneficial to health conscious buyers but the toughness of these cuts still makes them unattractive. In fact, many of these buyers indicate that leaner meats that are lower in fat content would be preferable if they were not so tough.

In addition to the health advantages of eating tougher, low fat meats, serving these cuts also is economically advantageous since tougher meat generally is less expensive than tender meat. Cost cutting in food procurements makes large scale purchases of low fat meat more attractive to large institutional and governmental buyers. However, the toughness of some cost effective cuts makes some of them substandard, or at least, less palatable, and serving such food is likely to have a demoralizing effect on workers. Since maintaining high moral is a significant factor toward high performance in the workplace and among personnel in the armed services, food should be tender and more palatable.

Meat has been tenderized by many different methods for years. The most common is simple mechanical pounding; however, pounding breaks the meat fibers, and changes the texture of the meat and its appearance. For example, pounding sirloin steak gives it an appearance and texture more akin to cheap hamburger than soft, tasty and more expensive sirloin. Lesser expensive cuts that are pounded also make this unappealing transition. Additionally, pounding is labor and mechanically intensive, prone to structural failure over relatively short operational cycles, and is slow.

Meat has been tenderized by aging. However, aging involves storing meat at controlled temperatures for three or four weeks. This is expensive since massive refrigerated storage space is required, and the flavor of the aged meat may be altered.

Chemical treatment of meats has also been used. By immersing the meat in a bath of enzymes or other chemicals over a period of time, meat can be tenderized. This method also takes some time but cuts aging time from three or four weeks down to around 10 days in a controlled refrigerated space. This method is also expensive due to the time and cost of refrigeration and constant replenishment of chemicals and enzymes. This method also changes the color, texture and flavor of the meat.

Other methods using ultrasonic massaging in water have been attempted and have proven largely ineffective due to the low power of the ultrasonic source and the low pressure waves produced. Essentially, low pressure waves from an ultrasonic source do not behave like shock waves, and as a result, low pressure waves fail to achieve the minimal levels of density of energy and power needed to effect the structural damage needed to tenderize.

Tenderizing has been attempted using shock waves generated by explosive charges. Explosive charges generate a spherical (point charge) shock wave in water to act upon a batch of meat. This batch method which has shown some promise but no positive commercial result is disclosed in U.S. Pat. Nos. 5,273,766 and 5,328,403. This batch method has numerous disadvantages: the use of explosives is dangerous and produces several direct and indirect products that are environmentally and commercially unacceptable. For this reason, meats have to be wrapped in airtight plastic bags prior to immersion into the water that fills the explosive chamber, and an inspection and decontamination procedure needs to be performed after detonation to ensure consumer health safety. In accordance with the process disclosed in these patents, detonation of the explosive charge sends a shock wave through the meat; but, since the meat is nearly the same relative density as water, the shock wave passes through yielding only marginal interaction with some meat fibers. Tests of this method have shown that detonation of explosives in a closed water-filled chamber produces a spherical shock wave that passes through the meat. A steel plate at the bottom of the closed, water filled chamber reflects the spherical shock wave back through the meat a second time after it passes through the meat a first time. In each pass, the shock wave is in the form of a spherical wave that only marginally interacts with some meat fibers. This process is difficult to control and lacks uniformity of tenderizing. In addition, there are obvious operational and liability risks of using chemical explosives, dealing with the noxious residue of each chemical explosion, and potentially contaminating the meat. The geometrical arrangement of the chamber disclosed in the above referenced patent is inefficient. The generation of destructive interferences of shock waves within the meat is indeterminable since spherical shock waves generated by the explosive charge rebound and reverberate off the steel walls of the container and the bottom plate hopefully where intended. This questionable effectiveness has further negated the potential value of the disclosed method of these patents. Furthermore, due to this inefficiency, large amounts of explosive must be used in order to get marginal improvement in tenderness. In addition, a large lid having associated shock absorbers and dampers must be used to contain the large detonation in the chamber. Any tenderizing by the explosive methods of processing batches usually is the result of brute force application of plenty of explosives in a single shot that must be reloaded after each shot. Thus, batch processing by detonating explosives is substantially more labor intensive than the efficient use of mechanically generated shock waves in the continuous process of this invention.

Thermal sterilization and high pressure sterilization methods are discussed in U.S. Pat. No. 5,588,357. Historically, some thermal sterilization methods and high-pressure sterilization methods have been used for sterilizing some kinds of food. In the thermal sterilization method, food is heated at a predetermined temperature through thermal conduction so that the food can be sterilized. Unfortunately, the thermal sterilization method results in degeneration of protein in food because of heating. In addition, thermally sterilized food sometimes emits a smell unique to thermal sterilization. In the high-pressure sterilization method, food is subjected to a high pressure, typically hundreds to thousands times atmospheric pressure to be sterilized. A conventional apparatus for the high-pressure sterilization method is large, and its sterilizing ability is poor since the apparatus is incapable of performing successive sterilizations.

The shockwave sterilizer of the '357 patent has an elastic container for containing food, a shock wave source which is disposed to face the elastic container, and a pressure transfer medium which is interposed between the shock wave source and the elastic container. A spherical shock wave emitted from the shock wave source is transferred to the elastic container through the pressure transfer medium. The shock wave is first applied onto food contained in the container and an expansion wave is next applied onto the food after a small time delay. When the shock wave and the expansion wave are applied, differences in the shock impedance of materials (of each individual cell of bacteria) create differences in the pressure change within each cell of bacteria. This in turn creates non-equilibrium force in each cell, and as a result, the cell is destroyed and the food is sterilized. The time required for radiating the shock wave is only a few hundred microseconds so that there will be no chemical change due to a high temperature or a change in the pressure such as thermal degeneration of protein or the like. Therefore, food can be sterilized at a normal temperature, and reliable sterilization is possible without any large scale and complex apparatus. This approach also requires overcoming the problem of bacterial contamination of the shock wave sterilizer, and is done in '357 by using a vaporizing electrode. But, the vaporizing electrode might be a source of meat contamination unless an elastic (plastic) barrier is used. The elastic barrier is included to withstand the peak impulse shock wave of the vaporizing electrode which may reach 6,000 psi, without rupturing. Because of this high peak impulse shock wave of the vaporizing electrode, it is conceivable that the plastic container will leak. This may require an expensive quality assurance process to ensure high confidence levels that the plastic container will not leak under all operational conditions.

Thus, in accordance with this inventive concept, a need has been recognized in the state of the art for an acceptable method of and means for tenderizing and sterilizing meat while maintaining its nutritional value.

SUMMARY OF THE INVENTION

The present invention is directed to providing a system and method to tenderize and sterilize batches of meat. A conveyer belt carries batches of meat through liquid in a container, and first and second arrays of electro-mechanical transducers are disposed in the liquid. The first array of electro-mechanical transducers is arranged facing one side of the conveyer belt and batch of meat, and the second array of electro-mechanical transducers is arranged facing the other side of the conveyer belt and meat. The first and second arrays of electro-mechanical transducers are oriented and controlled to simultaneously project converging shock waves of energy to and into the batch of meat. Other batches of meat are placed on and picked up from the conveyer belt by feeder and pick up conveyers to provide for continuous tenderizing and/or sterilizing without introducing contaminations.

An object of the invention is to provide a method of and means for tenderizing and sterilizing meat.

Another object of the invention is to provide a method of and means for tenderizing and sterilizing continuously meat products for the commercial meat packing industry.

Another object of the invention is to provide a method of and means for tenderizing and sterilizing meat using planar waves that synergistically collide within the meat.

Another object of the invention is to provide a method of and means for tenderizing and sterilizing meat using colliding planar shock waves which are generated from axially opposed high power electro-mechanical transducers.

Another object of the invention is to provide a method of and means for tenderizing and sterilizing meat using colliding planar shock waves which are generated from axially opposed high power electro-mechanical transducers without producing contaminants to provide for assembly-line processing of continuously moving batches of meat.

Another object of the invention is to provide a method of and means for tenderizing and sterilizing meat using virtually planar shock waves which are generated from multiple axially opposed high power electro-mechanical transducers to tenderize and sterilize meat via the synergistic effect of the density of energy of colliding shock waves within the intended meat target.

Another object of the invention is to provide a method of and means for tenderizing and sterilizing meat using planar shock waves from two axially opposed high power electro-mechanical transducers that synergistically collide within the meat target, which is located between the two electro-mechanical transducers.

Another object of the invention is to provide a method of and means for tenderizing and sterilizing meat relying on synergistic collision of two axially opposing shock waves to create an effect known as Mach Stem that generates at least one localized shearing plane (for tenderizing & sterilizing) perpendicular to the path of the axially opposing shock waves.

Another object of the invention is to provide a method of and means for tenderizing and sterilizing meat relying on the synergistic collision of two axially opposing shock waves to generate at least one localized shearing plane (for tenderizing & sterilizing) perpendicular to the path of the axially opposing shock waves to substantially rupture muscle, sinuous fibers, and cell membranes within the meat and to simultaneously tenderize and sterilize it.

Another object of the invention is to provide a method of and means for tenderizing and sterilizing meat relying on the synergistic collision of two axially opposing shock waves to generate at least one localized shearing plane each having a location of convergence that is controlled electrically (timing of the pulses) or mechanically (moving the meat through the shearing plane).

Another object of the invention is to provide a method of and means for tenderizing and sterilizing meat relying on the synergistic collision of two axially opposing shock waves to generate at least one localized shearing plane having shock wave convergence at multiple planes throughout the thickness of the meat to tenderize and sterilize the meat effectively, efficiently, uniformly, and safely.

Another object of the invention is to provide a method of and means for tenderizing and sterilizing meat that effectively and efficiently solves the problem of bacterial contamination without creating any new unacceptable problems.

Another object of the invention is to provide a method of and means for tenderizing and sterilizing meat relying on the synergistic effect of the energy density of colliding shock waves within the intended meat target without using a vaporization electrode.

Another object of the invention is to provide a method of and means for tenderizing and sterilizing meat uniformly and reliably throughout its entire volume without the need of a protective plastic container.

Another object of the invention is to provide a method of and means for tenderizing and sterilizing meat using colliding shock waves from axially opposed high power electromechanical transducers that may be used repeatedly at high rates over long periods of time without having to be replaced.

Another object of the invention is to provide a method of and means for tenderizing and sterilizing meat that can be tuned (rate of fire) and timed (firing time phasing) to provide various levels of energy to be imparted to the meat to be tenderized so as to be effective on a variety of meat types, precut or whole carcasses.

Another object of the invention is to provide a method of and means for tenderizing and sterilizing meat that does not use dangerous chemicals, explosives or vaporizing electrodes and reduces the need to wrap meat to avoid product contamination with by-products produced in contemporary methods.

Another object of the invention is to provide a method of and means for tenderizing and sterilizing meat that reduces the need for warehouses to store meat for chemical or environmental aging and further reduces the cost of meat by using healthier low-fat cuts.

Another object of the invention is to provide a method of and means for tenderizing and sterilizing meat using shock waves produced by axially opposing high power electromechanical transducer arrays to result in shock waves with longer pulse durations (positive pressure phases) than attainable with explosive devices or electrode vaporization devices.

Another object of the invention is to provide a method of and means for tenderizing and sterilizing meat using shock waves produced by axially opposing high power electromechanical transducer arrays to result in shock waves with sufficient peak pressures and impulses (the time-pressure integrals) to produce tenderizing & sterilizing of meats more efficiently (energy wise) than attainable with explosive devices or electrode vaporization devices.

Another object of the invention is to provide a method of and means for tenderizing and sterilizing meat capable of being fabricated in a variety of sizes and including differently powered opposing high power electromechanical transducer arrays to accomplish the job at hand.

Another object of the invention is to provide a method of and means for tenderizing and sterilizing meat that may use alternative fluids to perform similar functions, such as being used to clean things that are difficult to clean by other conventional methods and being modified for use in lithotripsy, for examples.

These and other objects of the invention will become more readily apparent from the ensuing specification when taken in conjunction with the appended claims.

DESCRIPTION OF THE PREFERRED EMBODIMENT

Figure 1:
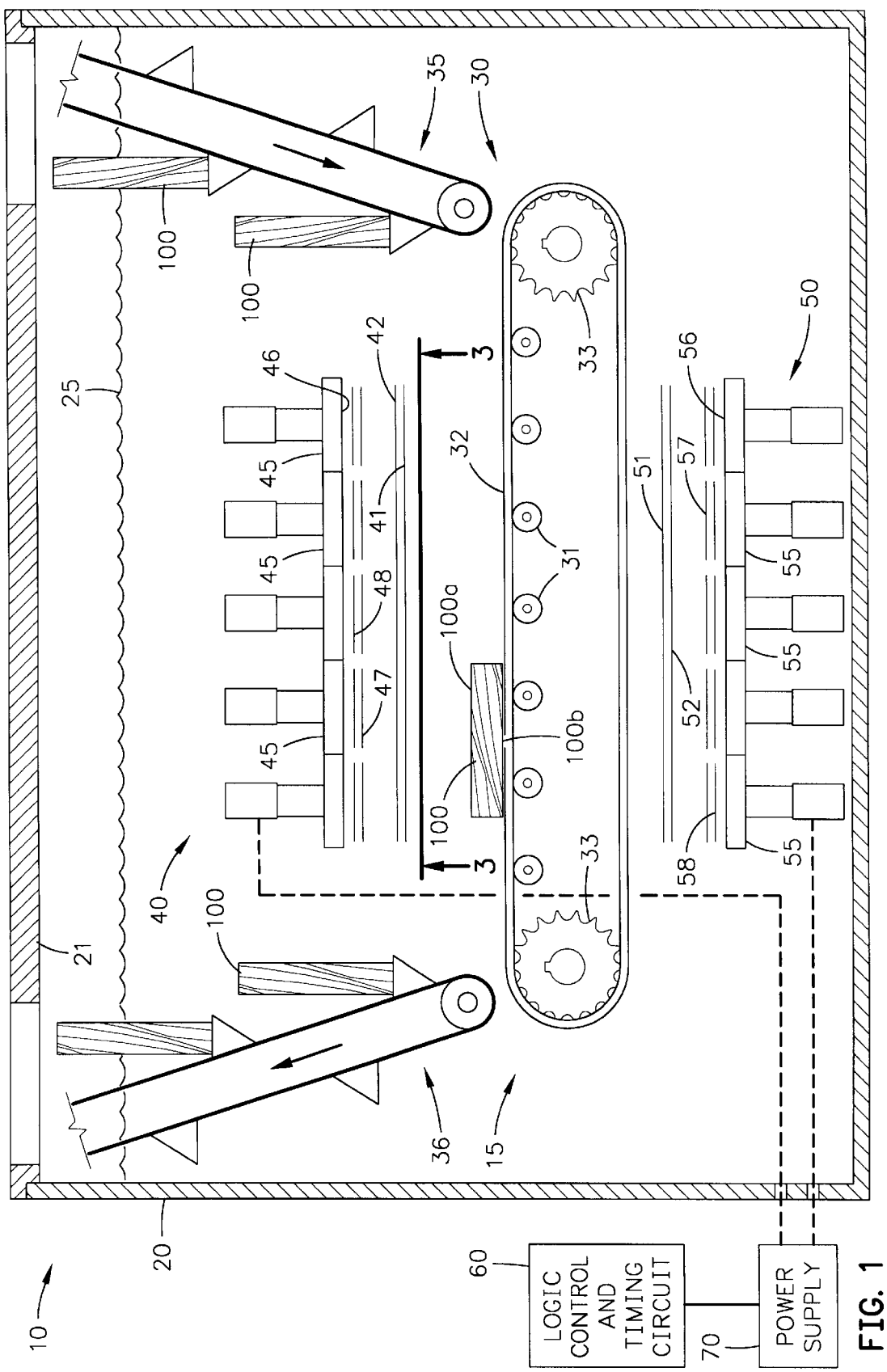
FIG. 1 is a schematic top view of the apparatus for tenderizing-sterilizing meat in accordance with this invention.

Referring to FIG. 1 of the drawings, tenderizer/sterilizer 10 is geared toward processing meat 100 for the commercial meat packing industry. Typically, meat 100 may be continuous batches, or commercial slabs that may weigh about 300 to 600 pounds. A smaller version of tenderizer/sterilizer 10 can be constructed based on the teachings detailed herein for home consumers to tenderize and/or sterilize smaller portions of meat 100. Therefore, numerous sizes and capacities of tenderizer/sterilizer 10 may be made in scaled versions depending upon the particular applications.

Figure 2:
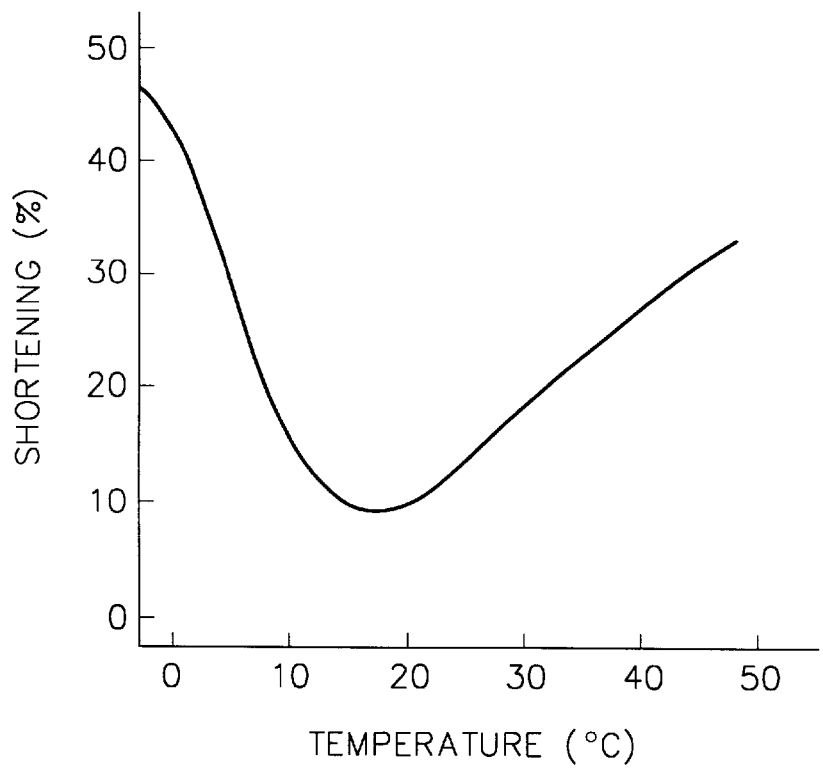
FIG. 2 shows shortening reduction as a function of temperature for pre-rigor chilling to 16° Celsius for 16 hours, (adapted from B. H. Locker and C. J. Hagyard's "A Cold Shortening Effect In Beef Muscle," *Journal of the Science of Food and Agriculture*, (1963).

Factors that make meat tender are well known and fully qualified. The following factors are well known and accepted ways to make meat tenderer:

1. Cause the sarcomere to be longer.
   (a) Prevent shortening of the sarcomeres caused by cold temperatures. Meat must be refrigerated to prevent spoiling. Locker and Hagyard's article cited above, including FIG. 2 showed that the sarcomeres shorten when refrigerated. They also showed new temperature affects the sarcomeres.
      (1) provide a thickness of subcutaneous fat equal to a thickness of about: 0.10 inches in lamb; 0.25 inches in beef. This thickness slows down temperature drop in muscle since fat is an insulator. The thicker the fat the better since the fat slows down temperature changes that occur from live to dead and from dead to refrigerated. Fatter makes the sarcomeres weaker and therefore, less prone to cold shortening
      (2) Chill meat at high temperature before rigor mortis sets in (to about 16° C. for 16 hours immediately after slaughter, see FIG. 2).
      (3) Apply electrical stimulation to meat at 550 volts, 2 to 6 amps, 15 times in one minute to cause a very rapid drop in muscle pH and much quicker onset of rigor mortis.
   (b) Stretch the sarcomere.
      (1) Apply Texas A&M TENDERSTRETCH™ technique that has suspension by the obturator foramen. Hindleg acts as a cantilever.
      (2) Apply Stouffer's Stretching Devices to A&M's TENDERSTRETCH™ technique to include clamps and stretching rods.
      (3) Apply the trademarked technique known as TENDERCUT™ wherein bones and connective tissues are cut around muscles to allow stretching of the tissue.
2. Disrupt the integrity of the myofibrils.
   (a) Increase activity of endogenous enzymes that include: (a) calpains, which are stored in the cytosol near Z-lines and require calcium to be activated, and/or (b) cathepsins, which are stored in lysosomes. Calpains work on Z-lines while cathepsins work on actin-myosin bonds. Calpastatin regulates calpains; the higher the calpastatin levels and activity, the less breakdown of myofibrils.
      (1) Apply aging by storing in cooler for 1 to 6 weeks at 0–30° C.
      (2) Apply high temperature, post-rigor chilling by storing at 200° C. for 24 hours, (same effect as 20° C. for 14 days).

(3) Apply high temperature, pre-rigor chilling by storing at 160° C. for 16 hours.

(4) Apply electrical stimulation of meat by rapid pH decline to rupture lysosome and release cathepsins.

(5) Infuse/inject calcium chloride into meat by pre-rigor infusion or post-rigor injection of a solution of calcium chloride into muscle to cause increased activity of calpains.

(b) Mechanically sever myofibrils.
  (1) Electrical stimulation causes violent contractions to tear myofibril.
  (2) Machines have multiple blades and/or needles to penetrate meat as it passes through on a conveyor. First machine was called a Jaccard and the process "Jaccarding."
  (3) Scoring, dicing, cubing, grinding or chopping meat created mechanical severance.
  (4) Placing meat in a sealed water-filled chamber and setting off an explosion in the process known under the trademarked process know as HYDRODYNE™.

(c) Topically add exogenous enzymes which are biochemical catalysts. Protease enzymes can break down collagen proteins that are found in skin, bone, and muscle
  (1) Papain, present in papaya and sold as meat tenderizer;
  (2) Bromelin, present in uncooked pineapple; and
  (3) Ficin, present in figs.

(d) Marinate meats with acids (vinegar or wine)

3. Disrupt the integrity of the connective tissue.
  (a) Use exogenous enzymes.
    (1) Marinate with salt and vinegar in a 2% solution of NaCl plus acetic acid in water.
    (2) Use fungal enzyme (rhozyme) such as *Aspergillus oryzae*.
    (3) Use tropical plant enzymes.
  (b) Sever stromal proteins.
    (1) Tenderize by blade or needle.
    (2) Effect mechanical severance.
  (c) Convert collagen to gelatin.
    (1) Cook by moist-heat cookery for a long time with steam generation, e. g. by braising, stewing, or simmering.

The following table shows the relationship between tenderness and meat cuts:

| Top Ten "Tender" and "Tough" Cuts in Shear Force (pounds) | | | |
|---|---|---|---|
| "Tender" cuts | Shear force | "Tough" cuts | Shear force |
| Tenderloin steak | 5.7 | Top round steak | 11.7 |
| Top blade steak | 6.7 | Eye of round steak | 10.3 |
| Top loin steak | 7.2 | Bottom round steak | 9.7 |
| Rib roast | 7.3 | Rump roast | 9.5 |
| Rib steak | 7.4 | Eye of round roast | 9.2 |
| Ribeye steak | 7.5 | Chuck roll steak | 9.2 |
| Chuck roll roast | 7.6 | Chuck tender steak | 9.0 |
| Clod roast | 7.9 | Top round roast | 9.0 |
| Round tip roast | 7.9 | Bottom round roast | 8.9 |
| Top sirloin steak | 8.0 | Round tip steak | 8.9 |

Shear force = pounds of force to shear one-half-inch cores, removed parallel to the muscle fibers, of cooked muscle from steaks and roasts.

The following table shows the traits of tender and tough meat:

| Factor: | "Tender" | "Tough" |
|---|---|---|
| Sarcomere length | 3.6 $\mu$m | 1.8 $\mu$m |
| muscle fiber diameter | 40 $\mu$m | 80 $\mu$m |
| Sarcomere/fragment | 6 | 15 |
| Amount of stromal protein | 3 mg/g | 8 mg/g |
| Size of elastin fibrils | 0.6 $\mu$m | 4.0 $\mu$m |
| Collagen solubility | 28% | 6% |
| Amount of marbling | 7% | 2% |
| Distribution of marbling | extensive | collected |

The following additional important factors affect meat tenderness:

1. Breed type: *Bos indicus* (Brahman, Sahiwal, etc.) breeds tend to be tougher than *Bos taurus* breeds (Angus, Hereford, etc.). *Bos indicus* has greater amounts of calpastatin, a protein that interferes with postmortem degradation of muscle.

2. Locomotive vs. support muscles: Less connective tissue is observed in support muscles.

3. Quality grade effects: Prime has more marbling than choice and choice has more than select.

4. Degree of doneness: As some meat is cooked to more advanced degrees of doneness, it will get tougher. Marbling helps to ensure acceptable tenderness at higher levels of doneness.

The problem of inconsistency in meat tenderness has been identified as a major concern of the meat industry. Results of various studies have indicated that differences in the rate and extent of postmortem tenderization are the principal sources of variation in meat tenderness and, thus, are likely to be the source of inconsistency in meat tenderness at the consumer level. As a result, in accordance with this inventive concept it has been discovered that reliable and consistent tenderizing is needed.

Furthermore, the use of the meat sterilizing process of this invention could reduce the incidence of bacterial contamination. The following facts are clear for *E. coli* 0157:H7 that is a virulent strain of the family of generic bacterial contamination:

According to Nov. 15, 1998 statistics from the U.S. Center for Disease Control:

In 1993, there were 16 outbreaks of *E. coli* 0157:H7, of which seven (44 percent) were attributable to ground beef.

In 1994, there were 34 outbreaks of *E. coli* 0157:H7, of which 13 (38 percent) were attributable to ground beef.

In 1995, there were 34 outbreaks of *E. coli* 0157:H7, of which 12 (35 percent) were attributable to ground beef.

In 1996, there were 32 outbreaks of *E. coli* 0157:H7, of which four (12.5 percent) were attributable to ground beef.

In 1997, there were 22 outbreaks of *E. coli* 0157:H7, of which two (9 percent) were attributable to ground beef.

In 1998, preliminary data showed there were 33 outbreaks of *E. coli* 0157:H7 of which seven (21 percent) were attributable to ground beef.

Research at Washington State University in 1993 showed that *E. coli* 0157:H7 was present in 0.5 percent of fed beef cattle.

Additionally, special U.S. Department of Agriculture (USDA) tests show that 0.2 percent of beef carcasses tested positive *E. coli* 0157:H7.

The Food Safety and Inspection Service (FSIS) division of the USDA began random testing for *E. coli* 0157:H7 in ground beef in October 1994. As of Dec. 18, 1998, more than 25,000 ground beef samples had been analyzed. *E. coli* 0157:H7 was found in 0.10 percent of the samples.

Those most susceptible to severe illness as a result of *E. coli* 0157:H7 are the elderly, young and those with compromised immune systems.

Typically, *E. coli* 0157:H7 related illnesses occur because the 0157:H7 serotype emits a toxin which can cause hemorrhagic colitis, a disease with symptoms of bloody diarrhea and severe abdominal pain. Approximately ten percent of these cases in children lead to hemolytic uremic syndrome (HUS), which is the leading cause of acute renal failure in children.

HUS may progress to thrombocytopenic purpura (TTP), a central nervous system disease, characterized by seizures and coma. Patients with TTP often develop blood clots in the brain, usually resulting in death.

The beef industry has invested more than $8.4 million since 1993 for applied research concerning food safety and *E. coli* 0157:H7.

To achieve reductions in microbial contamination, the meat packing and processing industry have implemented several intervention strategies. Among these are steam pasteurization, steam vacuuming and organic acid carcass rinsing, that are each designed to kill, reduce or remove bacteria. However, these methods are not effective, and other technologies, such as irradiation and ozonation, are in various stages of development.

Techniques currently in use to one degree or another to achieve reductions in microbial contamination include:

Rinsing the carcass with high temperature water. High temperature water is sprayed on the carcass at the final point in the slaughter process, which can reduce the remaining bacteria on the carcass. However, about 10 percent of beef plants do not use this process;

Misting the carcass with organic acid. An acidic solution, such as vinegar and water, in the form of a fine mist, is sprayed on the carcass after the hide is removed. This prevents certain bacteria from attaching to the outside of the carcass. However, about 85 percent of beef plants do not use this process;

Spraying the carcass with tri-sodium phosphate. TSP is an alkaline solution that can be sprayed on a carcass to prevent certain bacteria from attaching to the outside of the carcass. Used in combination with organic acid mists, the two treatments could prevent a range of bacteria from adhering to carcasses;

Pasteurizing the carcass with radiation. An intense pulse of energy is emitted either from a gamma radiation source like Cobalt 60 or from an electrical source like an electron beam accelerator. The energy irradiates and penetrates the meat and destroys bacteria. The U.S. Food and Drug Administration approved irradiation of red meats in December 1997. USDA must now issue a rule establishing proper application (to kill bacteria) and labeling requirements delineating all residual risks. The beef industry is awaiting USDA action;

Decomposing ozone in water contacting the carcass, or ozonation. Ozonation uses water infused with ozone molecules to reduce/eliminate bacterial contamination. As the ozone molecule (three oxygen atoms) decomposes to basic oxygen (two oxygen atoms), the released atom either could destroy bacteria with which it comes into contact or may react with existing chemical compounds to create a more benign byproduct. Application of ozonation for beef carcasses has not been fully developed, and its performance is unclear, but processes could include spraying or misting carcasses with ozonated water. The use of ozone treated chilled water for poultry decontamination is not practical in some facilities;

Pasteurizing the carcass by steam, or steam Pasteurization. Carcasses pass through a steam cabinet which emits a short blast (less than one second) of superheated steam (approximately 350 degrees Fahrenheit). The steam effectively pasteurizes the exterior of the carcass just before it enters the cooler. At the end of 1998, nearly 50 percent of America's beef was produced by packing plants that did not use steam pasteurization technology; and Vacuuming the carcass by steam to produce lower bacteria counts than what is possible with just a trimming knife. Other steam and hot water vacuums can only remove visible dirt or debris from the carcass aseptically without killing any bacteria. Although it is easy to implement this method, about 20 percent of beef plants do not use this technology.

Referring to FIG. 1, tenderizer/sterilizer 10 has large container 20 filled with liquid 25. Conveyor system 30 is disposed in container 20 and immersed in liquid 25. Container 20 may have lid 21 to prevent any of liquid 25 from being projected, or splashed from a boundary layer on the surface of liquid 25 during processing. Conveyor system 30 has rollers 31 supporting conveyer belt 32 that is displaced by drives 33. Drives 33 longitudinally and continuously move belt 32 and meat 100 through liquid 25 and past upper and lower arrays 40 and 50 of high power electro-mechanical transducers 45 and 55 that face and are located on opposite sides of belt 31 and immersed in liquid 25. Rollers 31 and belt 32 are made and function in much the same manner that is well known in the food processing industry, and drives 33 are controlled motor-driven assemblies that have been used this way for years. Belt 32 may be an endless design that reaches across container 20 to pick up and deliver other slabs of meat 100 generally where drives 33 are located. At these locations more slabs of meat 100 can be placed for tenderizing and/or sterilizing or processed slabs can be removed for packaging, for example.

Conveyor belt 32 (and rollers 31) within container 20 may be made from rubber or equivalent natural or manmade compounds that have essentially the same density as the water or oil that is chosen as liquid 25, the fluidic medium for transfer of shock waves from arrays 40 and 50. This feature is of particular significance since it allows shock waves to be discussed below to pass through without substantial interaction or impedance with conveyor belt 32 (as well as rollers 31). This is done to increase the efficiency of tenderizer/ sterilizer 10 by allowing the timing of generated shock waves to be a straightforward process without the need to employ cumbersome higher mathematics, wave shapers and other complicated structures for wave compensation.

Figure 3:
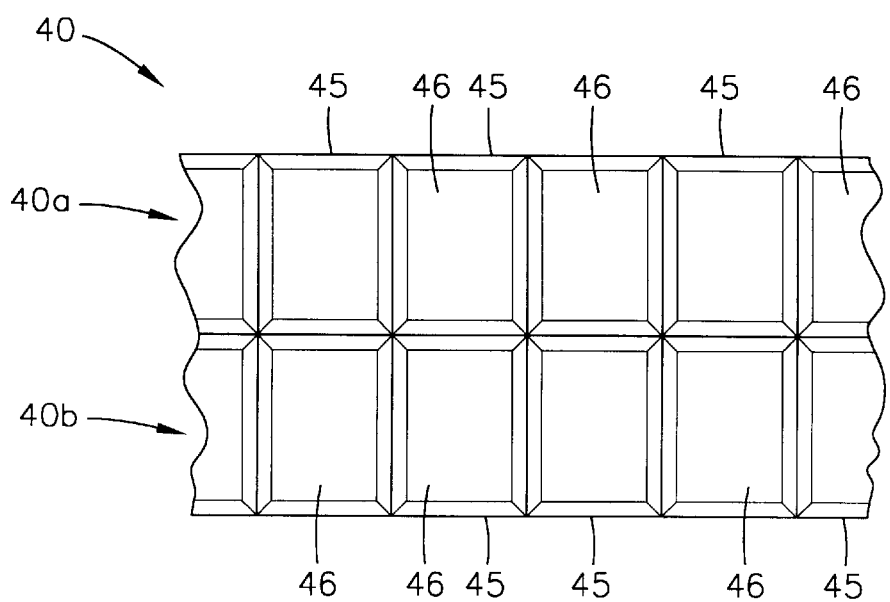
FIG. 3 is a front view of a typical array of electromechanical transducers arranged in adjacent rows taken along line 3—3 in FIG. 1.

Upper array 40 and lower array 50 of high power electro-mechanical transducers 45 and 55 are spaced the same distance above and below conveyer belt 32. High power electro-mechanical transducers 45 and 55 may each have a piston-shape and are respectively arranged in one or more adjacent rows 40*a* and 40*b*, see also FIG. 3 (rows 50*a* and 50*b* of array 50 are not shown). Transducers 45 and 55 of arrays 40 and 50 are arranged to orient their flat, or planar projection surfaces 46 and 56 in substantially coplanar relationships. Coplanar projection surfaces 46 are virtually parallel with coplanar projection surfaces 56. One typical design for each electro-mechanical transducer 45 and 55 could be the high power piezoelectric underwater transducer disclosed in U.S. Pat. No. 4,219,889, although many other different transducer designs might be selected to create converging shock waves in accordance with this invention.

Planar surfaces 46 and 56 of transducers 45 and 55 face conveyer belt 32 and meat 100 and are controlled to respectively each project energy away as first shock waves 47 and 57 that are projected separately in a planar form from each transducer and coaxial with the axis of each transducer. The energy of separate and planar first shock waves 47 from transducers 45 of array 40 is projected toward transducers 55 of array 50, and the energy of the separate and planar first shock waves 57 from transducers 55 of array 50 is projected toward transducers 45 of the array 40. Thus, arrays 40 and 50 project energy in the form of first shock waves 47 and 57 in an axially opposing relationship. Separate and planar first shock waves 47 and 57 each coalesce collectively a short distance from surfaces 46 and 56 to respectively form first composite shock waves 41 and 51 that are substantially coplanar. The directions of travel of first composite shock waves 41 and 51 are axially opposed and converge on meat 100 on conveyer belt 32.

Proper convergence of axially opposed first shock waves 47 and 57 and their collectively coalesced first composite shock waves 41 and 51 tenderizes and/or sterilizes meat 100. This processing is assured by appropriate actuation by proper timing signals from logic control and timing circuit 60 that are connected to power supply 70 and/or arrays 40 and 50. These timing signals are fed to power supply 70 which couples properly timed driving potentials to actuate, or drive transducers 45 and 55 of arrays 40 and 50, respectively.

The constituents of logic control and timing circuit 60 and power supply 70 for the control of high power electromechanical transducers are well known in the industry. For example, over the years, well-known arrangements of control logic, timing circuits, and power supplies with associated diodes and capacitor banks have been used to control the phase of projected energy in many different active arrays in sonar systems. Components 60 and 70, therefore, can be readily fabricated by one skilled in the art to actuate transducers to create the desired planar shock waves.

Water, oil, or similar fluidic medium 25 fills container 20 a sufficient depth to cover and immerse central conveyer 30, arrays 40 and 50, and one or more batches of meat 100. Successive batches of meat 100 to be tenderized/sterilized are sent down feeder conveyor 35 where they enter liquid 25 of tank 20 and travel to center conveyor 30. Meat 100 is placed on conveyer belt 32 of central conveyer 30 by feeder conveyor 35, and meat 100 is carried at a preset rate to and through liquid 25 in region 15 between arrays 40 and 50 of axially opposing high power electromechanical transducers 45 and 55. Conveyer belt 32 continues to move meat 100 through region 15 while arrays 40 and 50 of axially opposing rows of high power electro-mechanical transducers 45 and 55 tenderize/sterilize meat 100 with projected converging shock waves of energy. After meat 100 has been suitably tenderized and/or sterilized, conveyer belt 32 moves meat 100 to a pick up conveyor 36 which takes it from liquid 25 to another processing area. This progression is continuous and, therefore, cost effective as compared to the higher cost stop-and-go procedures that are characteristic of current state of the art batch processing.

In accordance with preestablished timing sequences of logic control and timing circuit 60 energy from the power supply 70 has already charged an internal bank of capacitors (not shown) that are linked to the rows of transducers 45 and 55 of arrays 40 and 50. Logic control and timing circuit 60 then initiates rows of transducers 45 and 55 of arrays 40 and 50 so as to virtually simultaneously actuate the high power electromechanical transducers 45 and 55 in each array to project shock waves of energy. In addition, actuation of transducers 45 and 55 in the adjacent rows of array 40 and array 50 may also need to be slightly phased with respect to one another to more completely converge energy of the rows of transducers onto meat 100. This actuation is initiated in sequences to produce simultaneous or phased sequences of first composite planar shock waves 47 and 57 to tenderized/sterilized meat 100 thoroughly as belt 32 carries it through region 15. Successive ones of first planar shock waves 47 and 57 are transmitted to be separated by an interval of between 25 and 50 milliseconds for tenderizing and sterilizing meat 100 in water as liquid 25.

Since each transducer 45 and 55 creates separate and planar first shock waves 47 or 57 within liquid 25, these separate planar shock waves 47 or 57 simultaneously travel away from the rows of transducers 45 or 55 of array 40 or 50 that generated them. A very short distance from surfaces 46 and 56 of transducers 45 and 55, these first shock waves 47 and 57 coalesce collectively to respectively form first composite shock waves 41 and 51 that may be substantially parallel to the upper and lower surfaces 100a and 100b of meat 100, and as mentioned above, successive ones of composite shock waves 41 and 51 also are separated by an interval of between 25 and 50 milliseconds. Each of planar shock waves 47 and 57 and composite shock waves 41 and 51 has a positive phase component that is attributable to the positive pressure spike generated during the initial part of each shock wave and a negative phase component that is attributable to the negative transition to vacuum immediately after the positive pressure spike.

However, in addition to separate and planar first shock waves 47 and 57, each transducer 45 and 55 of arrays 40 and 50 also produces an expanding bubble front. This bubble front expands behind each precursor shock wave (first planar shock wave 47 and 57), very close to the transducer that produced it, until the internal pressure forces of the bubbles and hydrostatic forces of fluid 25 reach equilibrium. When equilibrium is reached, each bubble front rapidly collapses and creates a separate and planar second shock wave 48 or 58 from each transducer 45 or 55. Second shock waves 48 and 58 follow very closely behind first shock waves 47 and 57, in the range of about 5 to 10 milliseconds behind the first shock waves. However, this timing is exemplary, and other timing schemes are possible. The timing of events is dependent on the energy density level deposited on the medium (water or oil); that is, a big shockwave takes longer to dissipate all its reverberation inside the chamber, affecting the ultimate trade-off among speed, distance, and power levels.

The multitude of second shock waves 48 and 58 coalesce collectively to respectively form large and substantially coplanar second composite shock waves 42 and 52. Second composite shock waves 42 and 52 are respectively virtually parallel to the first composite shock waves 41 and 51 and follow very closely behind them, in the order of from about 5 to 10 milliseconds behind the first composite shock waves.

The set of first and second composite shock waves 41 and 42 and the set of first and second composite shock waves 51 and 52 from the axially opposing array 40 and 50 collide in meat 100. This collision of the sets of composite shock waves produces Mach Stem effects that create two large spikes of pressure (or pressure spikes) closely separated in time. The first of the two large pressure spikes is caused by the colliding first composite shock waves 41 and 51 which each have a positive phase component and a negative phase component, and the second of the two large pressure spikes is caused by the colliding second composite shock waves 42 and 52.

Each of the two pressure spikes exerts its pressure uniformly and each extends in a separate plane that is perpendicular to the opposite directions of travel of shock wave sets 41, 42, and 51, 52 and substantially parallel to the planes of outer surfaces 100*a* and 100*b* of meat 100. When proper timing of transducers 45 and 55 of arrays 40 and 50 brings these two pressure spikes, or two-phase shearing planes, within meat 100, this effect cuts the sinuous fiber within meat 100 and thus tenderizes it along these planes.

Furthermore, having the two pressure spikes, or two-phase shearing planes separated by an interval of time in the range of 5 to 10 milliseconds provides for efficient sterilization by creating successive destructive absolute pressure spikes and absolute pressure differentials within and around each of bacteria and/or other undesirable organisms in meat 10. The destructive pressure spikes and differentials are created by the traveling positive phase components and the subsequent negative phase components of the first composite waves 41 and 51 and the positive phase component of the second composite waves 42 and 52.

The timing or phasing of the actuation of rows of transducers 45 and 55 of each array 40 and 50 is varied over several successive cycles such that sets of composite shock waves 41 and 42 and sets of composite shock waves 51 and 52 collide sequentially along different planes at different depths within meat 100. These sequential collisions of shock waves effectively tenderize it throughout the entire thickness of meat 100. Between cycles of actuation a finite amount of time is allowed to lapse before the next actuation cycle to allow any secondary shock and pressure waves to reverberate and dissipate. An exemplary repetition rate having an interval of between 25 and 50 milliseconds between successive shock waves is given for a water medium 25. Oil or other liquids for medium 25 would call for different repetition rates and different energy levels to achieve efficient sterilization and the two-phase shearing planes. Thus, it is seen that appropriate timing and phasing (firing of transducers) can be made to avoid any undesirable destructive or constructive shockwave interferences (attributable to time delay and/or mistiming between pulses and the speed of transition of meat 100 through tenderizer/sterilizer 10) that would degrade performance, repeatability, and uniformity of the delivered energy or power density levels of tenderizer/sterilized 10.

Tenderizer/sterilizer 10 continuously tenderizes and simultaneously sterilizes meat 100 uniformly and reliably throughout its entire volume without the need of a protective plastic container. The colliding composite shock waves in meat 100 may be appropriately controlled in power, duration, and rate of repetition by circuit 60 and supply 70 to effect tenderization and sterilization simultaneously or separately in projections of shock waves from arrays 40 and 50. These controlled colliding composite shock waves work like two hammers hammering simultaneously from axially opposed sides.

Tenderizer/sterilizer 10 makes efficient use of electrically induced mechanical shock waves for tenderizing and simultaneously sterilizing meat. High power electromechanical transducers 45 and 55 project axially opposing shock waves and can be used, or pulsed repeatedly at high rates over long periods of time without having to be replaced and without the producing contaminants. This feature further assures that tenderizer/sterilizer 10 is ideal for assembly line processing of batches of meat 100. Tenderizer/sterilizer 10 does not use dangerous chemicals, explosives, or vaporizing electrodes and reduces the need to wrap meat that other processes need to avoid product contamination with byproducts of processing. Tenderizer/sterilizer 10 can be tuned (rate of fire, or pulsed actuation) and timed (firing time phasing) to project different levels of energy to tenderize/sterilize meat 100 so as to be effective on a variety of meat types, precut or whole carcasses. Tenderizer/sterilizer 10 allows control and variation of the degree of tenderization and sterilization, and its size can be scaled for use in both the heavy meat packing industry and for the home consumer. The processing of tenderizer/sterilizer 10 substantially reduces the time otherwise necessary for meat to be stored in refrigerated warehouses during aging. Since tenderizer/sterilizer 10 eliminates the need for aging, shelf life on grocers' shelves can be increased, and taste of meat can be improved. Since large warehouses to store meat during chemical or environmental aging are no longer needed, the cost to deliver quality meat products is reduced, while using healthier low fat meat cuts.

Tenderizer/sterilizer 10 uses axially opposing high power electro-mechanical transducer arrays 40 and 50 to generate tenderizing and sterilizing shock waves. Shock waves produced by axially opposing high power electro-mechanical transducer arrays 40 and 50 create shock waves having longer pulse durations (positive pressure phases) than those attainable with explosive devices or electrode vaporization devices of the prior art. Shock waves produced by axially opposing high power electro-mechanical transducer arrays 40 and 50 create shock waves having sufficient peak pressure and impulse which are the time-pressure integrals that may be affected by length and frequency of pulses that actuate the transducers. This feature produces tenderizing and sterilizing of meat 100 more efficiently with respect to energy expended as compared to explosive devices or electrode vaporization devices. Explosive devices or electrode vaporization devices of the prior art produce sharp pressure pulse spikes, requiring over pressurization to effect work which could be done at lower pressures but with longer pulse durations by the invention.

The prior art has recognized the fact that work can be done by sharp pressure spikes more efficiently while under water or similar dense fluid, and this was the technical basis for development and fielding a family of underwater explosives of which PBXN-103 is probably the best known member. Thermodynamically speaking, no work and no energy can be exchanged in no time, and accordingly, substantial energy must be expended by large detonations to create pressure spikes significant enough to produce useful results. This substantial energy expenditure makes these detonations inefficient with respect to energy used by tenderizer/sterilizer 10 of this invention.

More powerful or less powerful axially opposing high power electro-mechanical transducers arrays 40 and 50 may be employed depending on the application. A limitation regarding size might be the level, or density of power fed to the axially opposing high power electromechanical transducer arrays 40 and 50. The current moving capacity of modern conventional materials used in the high power electromechanical transducer industry might be exceeded so that alternative fluids might be used to perform this function. Tenderizer/sterilized 10 might be modified to clean things that are difficult to clean by other conventional methods, or it may be modified for use in lithotripsy.

Furthermore, having this disclosure in mind, one skilled in the art to which this invention pertains will select and assemble suitable components for fabrication of different tenderizers/sterilizers 10 from among a wide variety of materials and components available in the art to satisfactorily tenderize and/or sterilize meat 100 as disclosed herein. Therefore, the disclosed arrangement is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. A system to tenderize meat comprising:

liquid in a container;

a conveyer belt in said liquid in said container to support a batch of meat and move it through said liquid, said conveyer belt and said meat having first and second oppositely facing sides;

first and second arrays of electro-mechanical transducers disposed in said liquid, said first array of electro-mechanical transducers being arranged facing said first side of said conveyer belt and said second array of electro-mechanical transducers being arranged facing said second side of said conveyer belt, said first and second arrays of electro-mechanical transducers being oriented and controlled to simultaneously project converging first shock waves of energy being separate and planar from each of said electro-mechanical transducers to said meat.

2. A system according to claim 1 further comprising:

logic control and timing circuit to generate timing signals; and power supply coupled to said logic control and timing circuit, said power supply actuating said electromechanical transducers of said first and second arrays in response to said timing signals to project said first shock waves.

3. A system according to claim 2 in which said first and second arrays of electro-mechanical transducers are arranged in adjacent rows, and said liquid and said conveyer belt have essentially the same density to allow shock waves to pass through without substantial interaction or impedance.

4. A system according to claim 3 in which said first shock waves from said electro-mechanical transducers of said first array coalesce collectively a distance therefrom to form substantially coplanar first composite shock waves, and said first shock waves from said electro-mechanical transducers of said second array coalesce collectively a distance therefrom to form substantially coplanar first composite shock waves, said first composite shock waves from said first array and said first composite shock waves from said second array traveling in axially opposed directions to converge in said meat on said conveyer belt.

5. A system according to claim 4 in which said electromechanical transducers in said adjacent rows are actuated by phased timing signals to more completely converge said first composite shock waves in said meat.

6. A system according to claim 5 in which said first and second arrays of electro-mechanical transducers each also produce second shock waves of energy separate and planar from each of said electro-mechanical transducers that follow behind said first shock waves.

7. A system according to claim 6 wherein said second shock waves from said electro-mechanical transducers of said first array coalesce collectively a distance therefrom to form substantially coplanar second composite shock waves, and said second shock waves from said electro-mechanical transducers of said second array coalesce collectively a distance therefrom to form substantially coplanar second composite shock waves, said second composite shock waves from said first array and said second composite shock waves from said second array traveling in axially opposed directions to converge in said meat on said conveyer belt.

8. A system according to claim 7 wherein said first and second composite shock waves from said first array and first and second composite shock waves from said second array collide in said meat to create two large pressure spikes closely separated in time.

9. A system according to claim 8 wherein said two large pressure spikes each exert their pressure uniformly to create two-phase shearing planes that each extend in separate planes in said meat perpendicular to the opposing directions of travel of said first and second composite shock waves to cut sinuous fibers within said meat and tenderize it along said planes.

10. A system according to claim 9 wherein said two-phase shearing planes are separated from one another by a time interval in the range of 5 to 10 milliseconds.

11. A system according to claim 4 wherein successive ones of said first shock waves from said electro-mechanical transducers of said first array and successive ones of said first shock waves from said electro-mechanical transducers of said second array are transmitted having an interval of between 25 and 50 milliseconds therebetween.

12. A system to sterilize meat comprising:

liquid in a container;

a conveyer belt in said liquid in said container to support a batch of meat and move it through said liquid, said conveyer belt and said meat having first and second oppositely facing sides;

first and second arrays of electro-mechanical transducers disposed in said liquid, said first array of electro-mechanical transducers being arranged facing said first side of said conveyer belt and said second array of electro-mechanical transducers being arranged facing said second side of said conveyer belt, said first and second arrays of electro-mechanical transducers being oriented and controlled to simultaneously project converging first shock waves of energy being separate and planar from each of said electro-mechanical transducers to said meat.

13. A system according to claim 12 further comprising:

logic control and timing circuit to generate timing signals; and power supply coupled to said logic control and timing circuit, said power supply actuating said electro-mechanical transducers of said first and second arrays in response to said timing signals to project said first shock waves.

14. A system according to claim 13 in which said first and second arrays of electro-mechanical transducers are arranged in adjacent rows, and said liquid and said conveyer belt have essentially the same density to allow shock waves to pass through without substantial interaction or impedance.

15. A system according to claim 14 in which said first shock waves from said electro-mechanical transducers of said first array coalesce collectively a distance therefrom to form substantially coplanar first composite shock waves, and said first shock waves from said electro-mechanical transducers of said second array coalesce collectively a distance therefrom to form substantially coplanar first composite shock waves, said first composite shock waves from said first array and said first composite shock waves from said second array traveling in axially opposed directions to converge in said meat on said conveyer belt.

16. A system according to claim 15 in which said electro-mechanical transducers in said adjacent rows are actuated by phased timing signals to more completely converge said first composite shock waves in said meat.

17. A system according to claim 16 in which said first and second arrays of electro-mechanical transducers each also produce second shock waves of energy separate and planar from each of said electro-mechanical transducers that follow behind said first shock waves.

18. A system according to claim 17 wherein said second shock waves from said electro-mechanical transducers of said first array coalesce collectively a distance therefrom to form substantially coplanar second composite shock waves, and said second shock waves from said electro-mechanical transducers of said second array coalesce collectively a distance therefrom to form substantially coplanar second composite shock waves, said second composite shock waves from said first array and said second composite shock waves from said second array traveling in axially opposed directions to converge in said meat on said conveyer belt.

19. A system according to claim 18 wherein said first and second composite shock waves from said first array and first and second composite shock waves from said second array collide in said meat to create two large pressure spikes closely separated in time.

20. A system according to claim 19 wherein said two large pressure spikes each exert their pressure uniformly to create two-phase shearing planes that each extend in separate planes in said meat perpendicular to the opposing directions of travel of said first and second composite shock waves to cut sinuous fibers within said meat and tenderize it along said planes.

21. A system according to claim 20 wherein said two-phase shearing planes are separated from one another by a time interval in the range of 5 to 10 milliseconds to provide for sterilization by creating destructive pressure differentials within organisms in said meat.

22. A system according to claim 15 wherein successive ones of said first shock waves from said electro-mechanical transducers of said first array and successive ones of said first shock waves from said electro-mechanical transducers of said second array are transmitted having an interval of between 25 and 50 milliseconds therebetween.

23. A method for tenderizing meat comprising the steps of:
    filling at least partially a container with liquid;
    immersing a conveyer belt in said liquid in said container to support a batch of meat;
    moving said meat through said liquid on said conveyer belt;
    providing first and second arrays of electro-mechanical transducers in said liquid, said first array of electro-mechanical transducers being arranged facing said first side of said conveyer belt and said second array of electro-mechanical transducers being arranged facing said second side of said conveyer belt;
    orientating said first and second arrays of electro-mechanical transducers to project toward said meat; and
    projecting converging separate and planar first shock waves of energy simultaneously from each of said electro-mechanical transducers of said first and second arrays to said meat.

24. A method according to claim 23 further comprising the steps of:
    generating timing signals in logic control and timing circuit; and
    coupling power from a power supply in response to said timing signals;
    actuating said electro-mechanical transducers of said first and second arrays in response to said timing signals to control said step of projecting converging first shock waves.

25. A method according to claim 24 further comprising the steps of:
    arranging electro-mechanical transducers of said first and second arrays of electro-mechanical transducers in adjacent rows; and
    selecting said liquid and said conveyer belt to have essentially the same density to allow shock waves to pass through without substantial interaction or impedance.

26. A method according to claim 25 further comprising the steps of:
    coalescing collectively said first shock waves from said electro-mechanical transducers of said first array a short distance therefrom to form substantially coplanar first composite shock waves;
    coalescing collectively said first shock waves from said electro-mechanical transducers of said second array a short distance therefrom to form substantially coplanar first composite shock waves, said first composite shock waves from said first array and said first composite shock waves from said second array traveling in axially opposed directions; and
    converging said first composite shock waves from said first array and said first composite shock waves from said second array in said meat on said conveyer belt.

27. A method according to claim 26 further comprising the step of:
    actuating said electromechanical transducers in said adjacent rows by phased timing signals to more completely converge said first composite shock waves in said meat.

28. A method according to claim 27 further including the step of:
    producing second shock waves of energy separate and planar from each of said electro-mechanical transducers in said first and second arrays behind said first shock waves.

29. A method according to claim 28 further comprising the steps of:
    coalescing collectively said second shock waves from said electro-mechanical transducers of said first array a short distance therefrom to form substantially coplanar second composite shock waves;
    coalescing collectively said second shock waves from said electro-mechanical transducers of said second array a short distance therefrom to form substantially coplanar second composite shock waves, said second composite shock waves from said first array and said second composite shock waves from said second array traveling in axially opposed directions; and
    converging said second composite shock waves from said first array and said second composite shock waves from said second array in said meat on said conveyer belt.

30. A method according to claim 29 further comprising the step of:
    colliding said first and second composite shock waves from said first array and first and second composite shock waves from said second array in said meat.

31. A method according to claim 30 further comprising the step of:

creating two-phase shearing planes having uniformity of pressure by said two large pressure spikes, said two-phase shearing planes exerting their pressure uniformly each extending in separate planes in said meat perpendicular to the opposing directions of travel of said first and second composite shock waves to cut sinuous fibers within said meat and tenderize it along said planes.

32. A method according to claim 31 further comprising the step of:

separating in time said two-phase shearing planes from one another by a time interval in the range of 5 to 10 milliseconds to provide for sterilization.

33. A method according to claim 32 wherein said step of separating in time creates destructive pressure differentials within organisms in said meat.

34. A method according to claim 23 further comprising the step of:

separating in time successive ones of said first shock waves from said electro-mechanical transducers of said first array and successive ones of said first shock waves from said electro-mechanical transducers of said second array by a time interval in the range of 25 to 50 milliseconds therebetween.

35. A method according to claim 30 wherein said step of colliding said first and second composite shock waves from said first array and first and second composite shock waves from said second array creates two large pressure spikes closely separated in time.

* * * * *